US012659176B2

(12) United States Patent
Wu et al.

(10) Patent No.: US 12,659,176 B2
(45) Date of Patent: Jun. 16, 2026

(54) PHYSICALLY UNCLONEABLE FUNCTION AS SECURE STORAGE

(71) Applicant: Cryptography Research, Inc., San Jose, CA (US)

(72) Inventors: Winthrop John Wu, Pleasanton, CA (US); Scott C. Best, Palo Alto, CA (US); Joel Wittenauer, Pleasanton, CA (US)

(73) Assignee: RAmbus Inc., San Jose, CA (US)

( * ) Notice: Subject to any disclaimer, the term of this patent is extended or adjusted under 35 U.S.C. 154(b) by 85 days.

(21) Appl. No.: 18/717,243

(22) PCT Filed: Nov. 28, 2022

(86) PCT No.: PCT/US2022/051080
§ 371 (c)(1),
(2) Date: Jun. 6, 2024

(87) PCT Pub. No.: WO2023/107287
PCT Pub. Date: Jun. 15, 2023

(65) Prior Publication Data
US 2025/0038999 A1 Jan. 30, 2025

Related U.S. Application Data

(60) Provisional application No. 63/286,432, filed on Dec. 6, 2021.

(51) Int. Cl.
*H04L 9/32* (2006.01)
*G06F 21/72* (2013.01)

(52) U.S. Cl.
CPC ............ *H04L 9/3278* (2013.01); *G06F 21/72* (2013.01)

(58) Field of Classification Search
CPC ..... H04L 9/3278; H04L 9/0866; G06F 21/72; G09C 1/00
See application file for complete search history.

(56) References Cited

U.S. PATENT DOCUMENTS 9,946,858 B2 4/2018 Wallrabenstein
10,146,464 B2 12/2018 Murray et al.
(Continued)

OTHER PUBLICATIONS

Notification of Transmittal of the International Search Report and the Written Opinion of the International Searching Authority, or the Declaration with Mail Date Mar. 20, 2023 re: Int'l Appln. No. PCT.US2022/051080. 16 pages.

*Primary Examiner* — Daniel D Chang
(74) *Attorney, Agent, or Firm* — The Neudeck Law Firm, LLC

(57) ABSTRACT

Multiple helper data solutions (a.k.a., helper data images) are generated to produce preselected non-random values (a.k.a., "target values") from a physically unclonable function (PUF) circuit. Therefore, multiple preselected PUF output values may be generated for a given integrated circuit die, where each the output values are derived from a combination of the chip-unique PUF circuit and the chip-unique helper data solution. These helper data blocks are stored in a nonvolatile memory on the integrated circuit die. In an embodiment, the preselected non-random values may be used as secret encryption or decryption keys. In this manner, multiple secret values can be reliably stored within a chip, using a combination of the chip-unique PUF circuit and the multiple chip-unique helper data solution.

20 Claims, 15 Drawing Sheets

(56) References Cited

U.S. PATENT DOCUMENTS

| 10,521,616 | B2 | 12/2019 | Wallrabenstein |
| 2015/0234751 | A1* | 8/2015 | Van Der Sluis .... G06F 12/1408 |
| | | | 713/193 |
| 2016/0359636 | A1* | 12/2016 | Kreft .................. H04L 63/0428 |
| 2021/0271542 | A1* | 9/2021 | Marson .............. G06F 11/1048 |

* cited by examiner

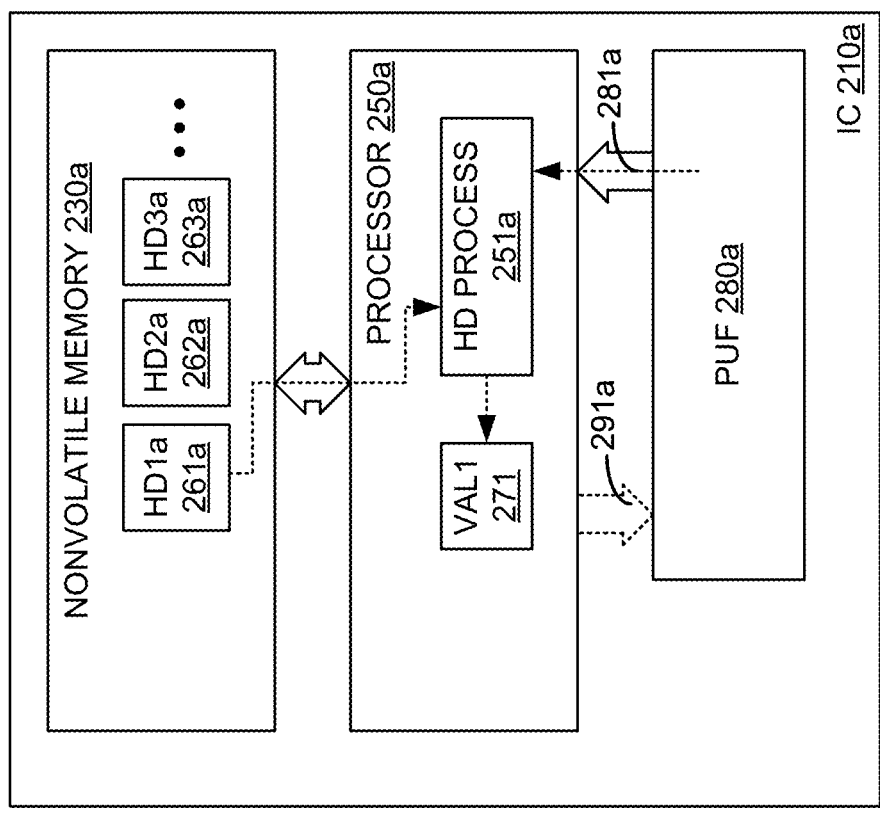
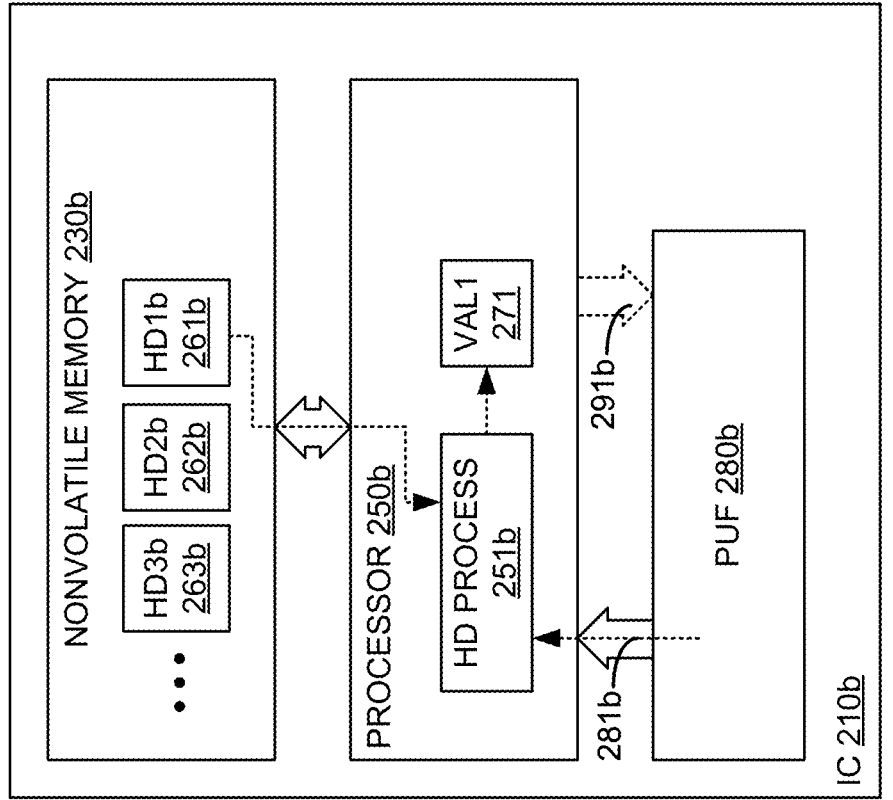
*FIG. 2A*

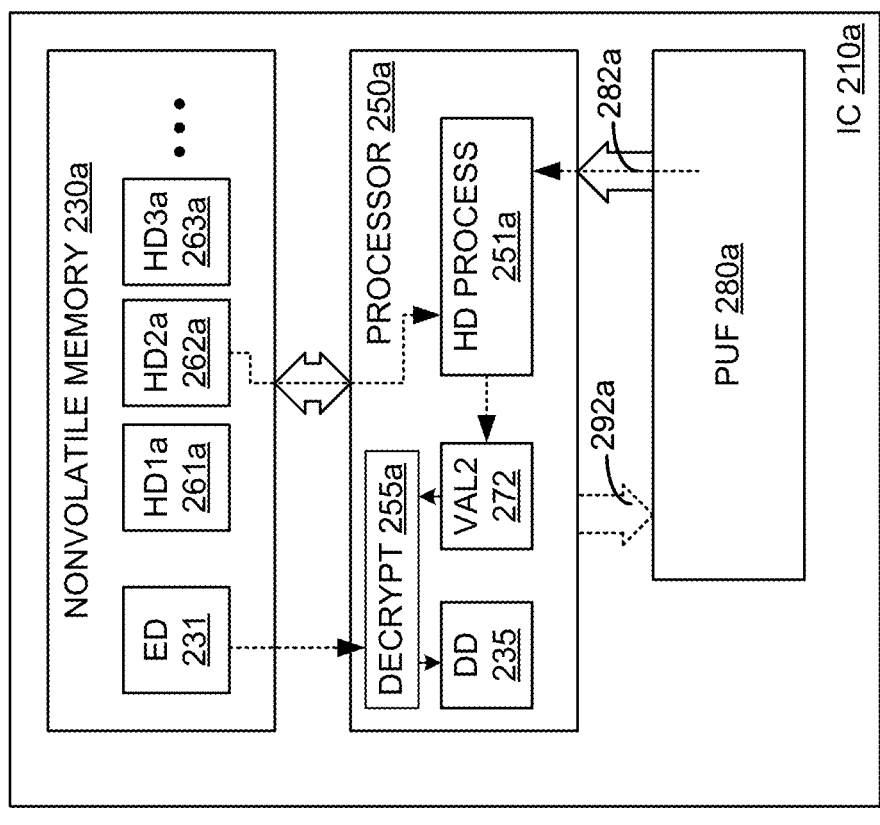
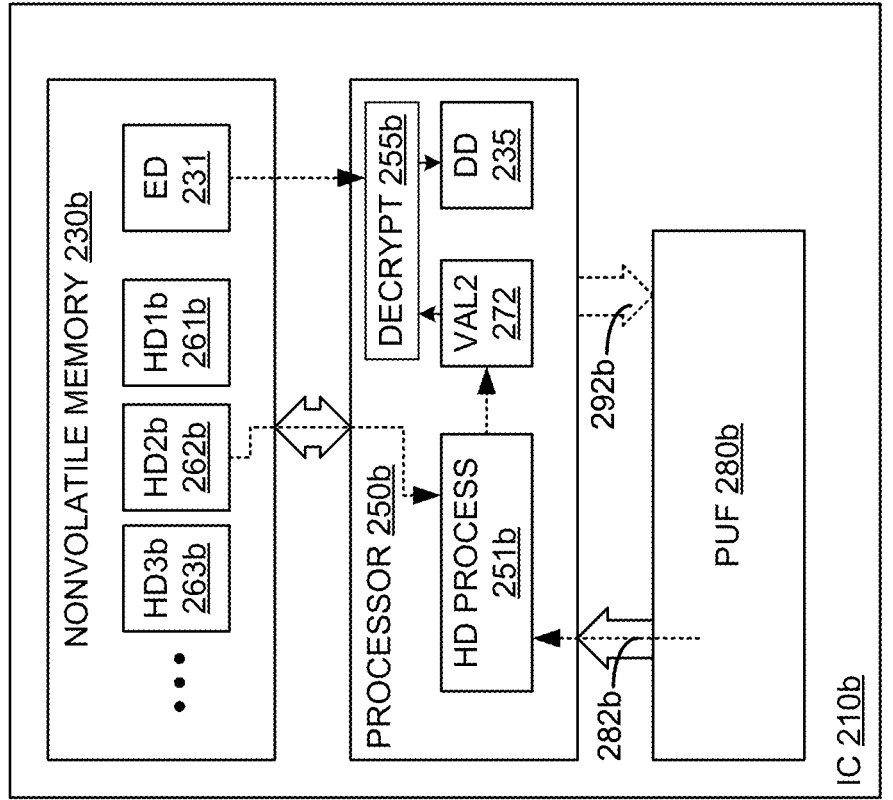
*FIG. 2B*

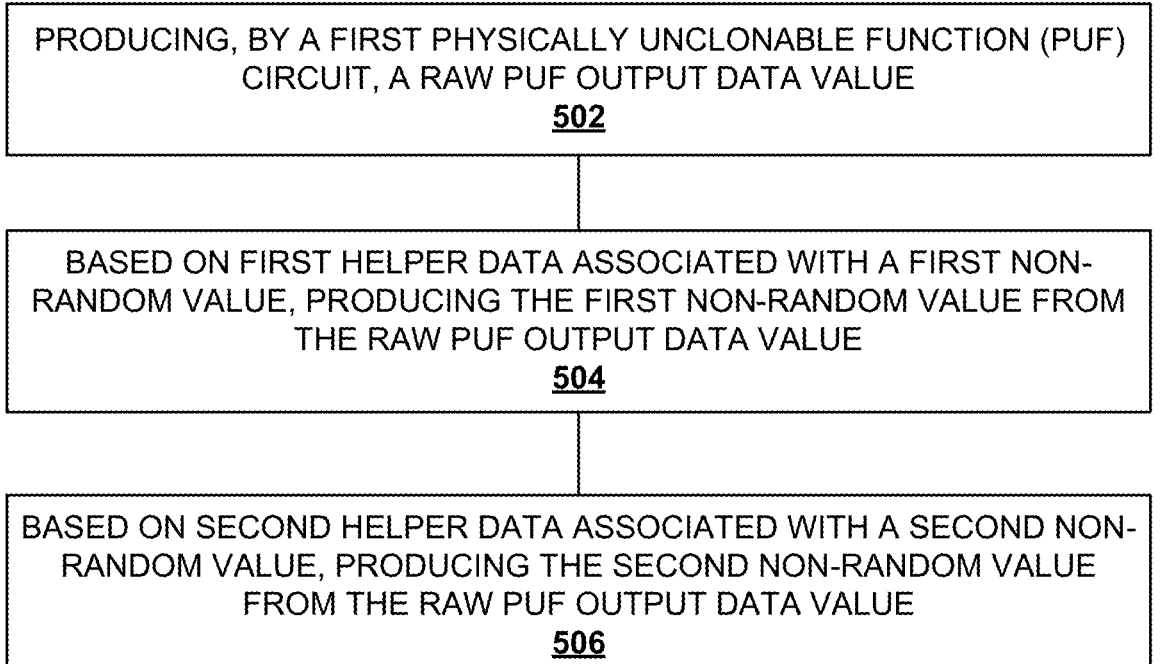

PRODUCING, BY A FIRST PHYSICALLY UNCLONABLE FUNCTION (PUF) CIRCUIT, A RAW PUF OUTPUT DATA VALUE
502

BASED ON FIRST HELPER DATA ASSOCIATED WITH A FIRST NON-RANDOM VALUE, PRODUCING THE FIRST NON-RANDOM VALUE FROM THE RAW PUF OUTPUT DATA VALUE
504

BASED ON SECOND HELPER DATA ASSOCIATED WITH A SECOND NON-RANDOM VALUE, PRODUCING THE SECOND NON-RANDOM VALUE FROM THE RAW PUF OUTPUT DATA VALUE
506

*FIG. 5*

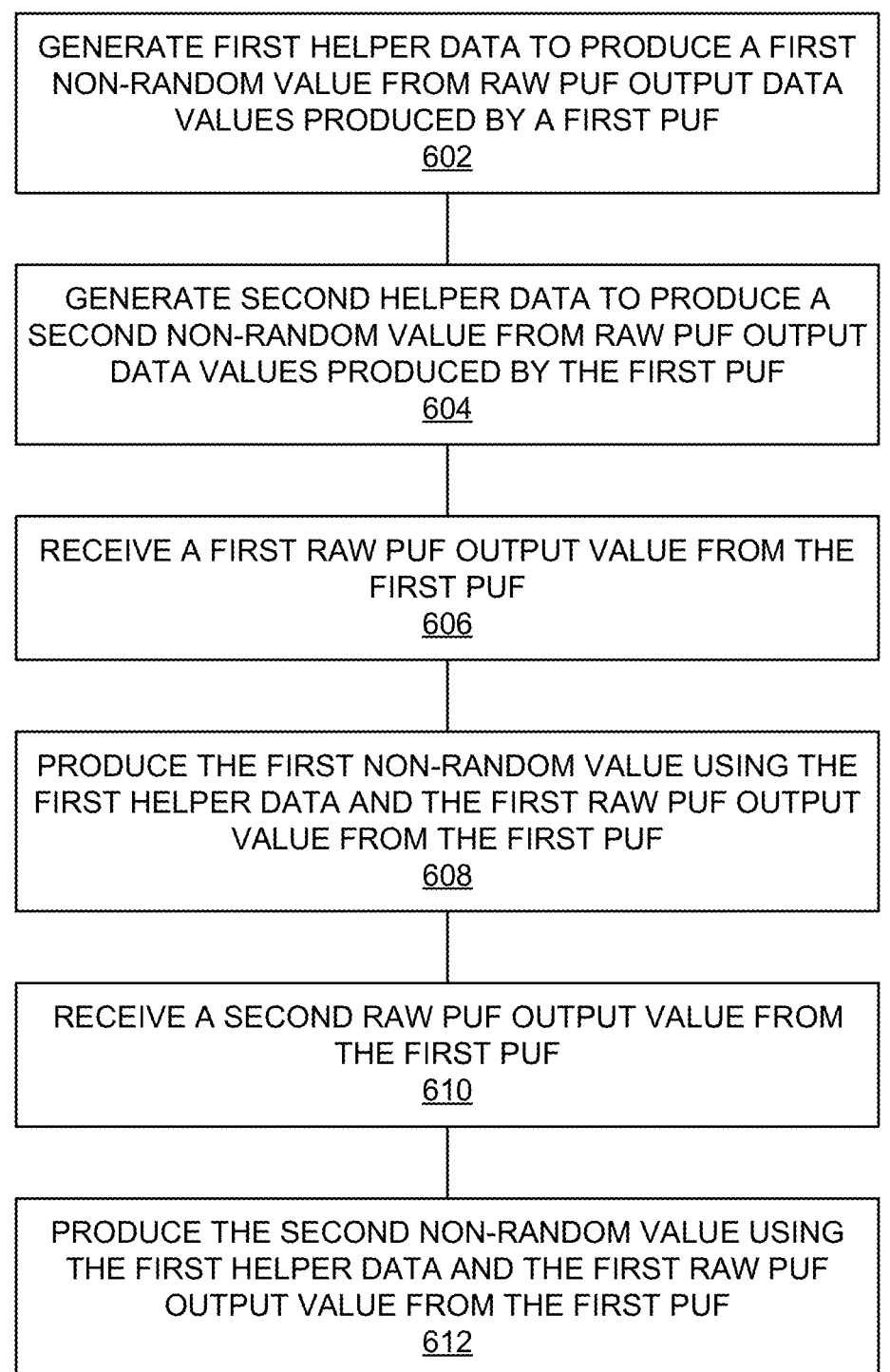

GENERATE FIRST HELPER DATA TO PRODUCE A FIRST
NON-RANDOM VALUE FROM RAW PUF OUTPUT DATA
VALUES PRODUCED BY A FIRST PUF
602

GENERATE SECOND HELPER DATA TO PRODUCE A
SECOND NON-RANDOM VALUE FROM RAW PUF OUTPUT
DATA VALUES PRODUCED BY THE FIRST PUF
604

RECEIVE A FIRST RAW PUF OUTPUT VALUE FROM THE
FIRST PUF
606

PRODUCE THE FIRST NON-RANDOM VALUE USING THE
FIRST HELPER DATA AND THE FIRST RAW PUF OUTPUT
VALUE FROM THE FIRST PUF
608

RECEIVE A SECOND RAW PUF OUTPUT VALUE FROM
THE FIRST PUF
610

PRODUCE THE SECOND NON-RANDOM VALUE USING
THE FIRST HELPER DATA AND THE FIRST RAW PUF
OUTPUT VALUE FROM THE FIRST PUF
612

*FIG. 6*

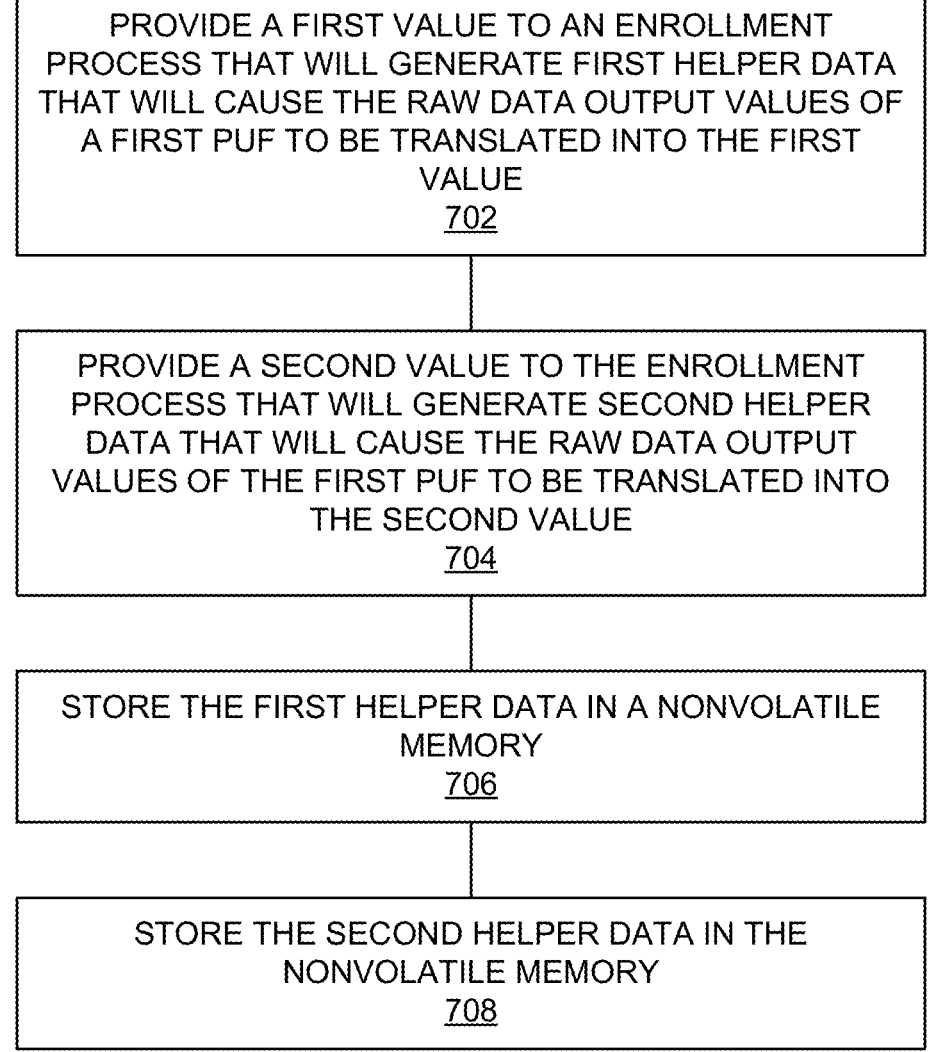

PROVIDE A FIRST VALUE TO AN ENROLLMENT
PROCESS THAT WILL GENERATE FIRST HELPER DATA
THAT WILL CAUSE THE RAW DATA OUTPUT VALUES OF
A FIRST PUF TO BE TRANSLATED INTO THE FIRST
VALUE
702

PROVIDE A SECOND VALUE TO THE ENROLLMENT
PROCESS THAT WILL GENERATE SECOND HELPER
DATA THAT WILL CAUSE THE RAW DATA OUTPUT
VALUES OF THE FIRST PUF TO BE TRANSLATED INTO
THE SECOND VALUE
704

STORE THE FIRST HELPER DATA IN A NONVOLATILE
MEMORY
706

STORE THE SECOND HELPER DATA IN THE
NONVOLATILE MEMORY
708

*FIG. 7*

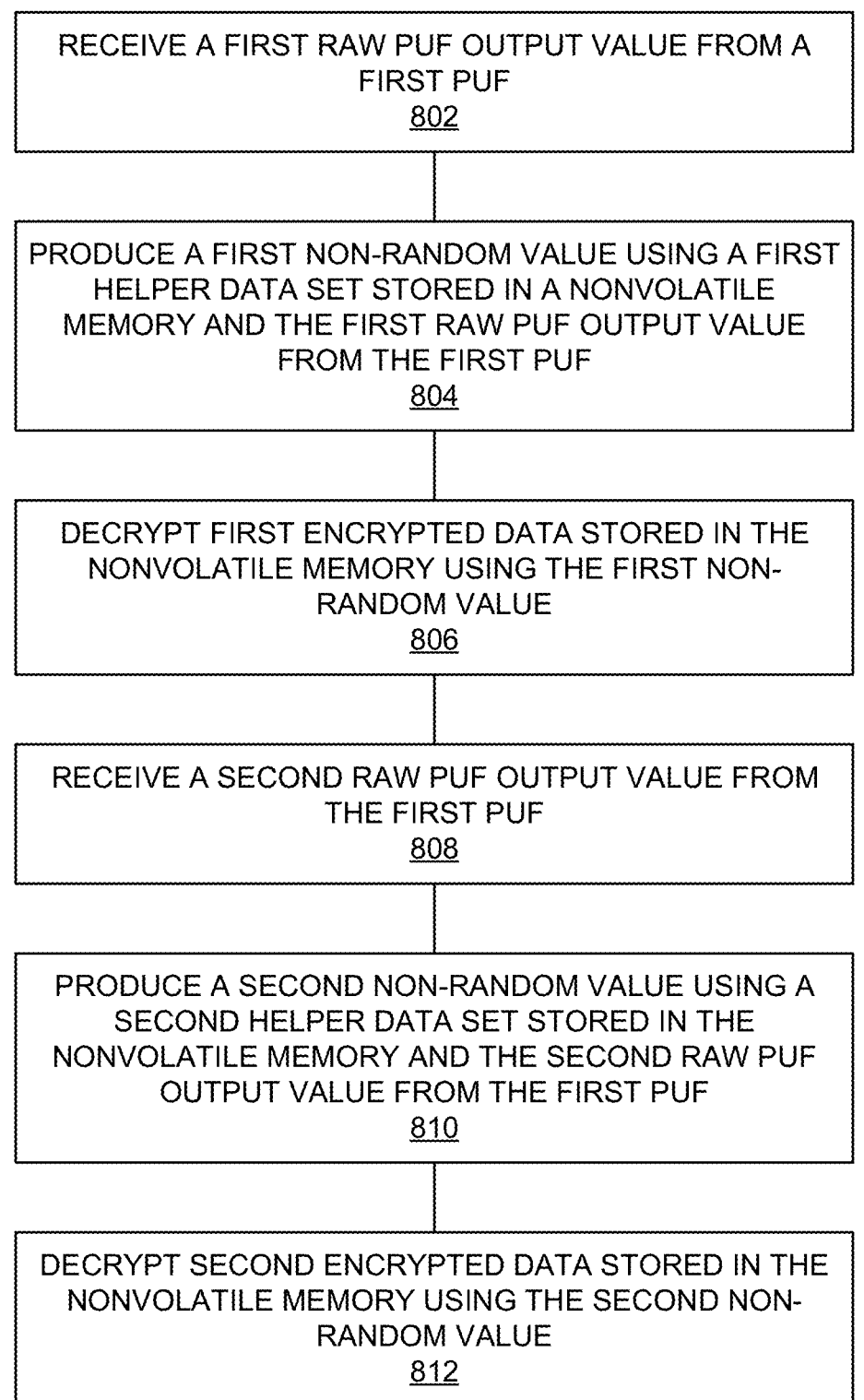

RECEIVE A FIRST RAW PUF OUTPUT VALUE FROM A
FIRST PUF
802

PRODUCE A FIRST NON-RANDOM VALUE USING A FIRST
HELPER DATA SET STORED IN A NONVOLATILE
MEMORY AND THE FIRST RAW PUF OUTPUT VALUE
FROM THE FIRST PUF
804

DECRYPT FIRST ENCRYPTED DATA STORED IN THE
NONVOLATILE MEMORY USING THE FIRST NON-
RANDOM VALUE
806

RECEIVE A SECOND RAW PUF OUTPUT VALUE FROM
THE FIRST PUF
808

PRODUCE A SECOND NON-RANDOM VALUE USING A
SECOND HELPER DATA SET STORED IN THE
NONVOLATILE MEMORY AND THE SECOND RAW PUF
OUTPUT VALUE FROM THE FIRST PUF
810

DECRYPT SECOND ENCRYPTED DATA STORED IN THE
NONVOLATILE MEMORY USING THE SECOND NON-
RANDOM VALUE
812

*FIG. 8*

PHYSICALLY UNCLONEABLE FUNCTION AS SECURE STORAGE

BRIEF DESCRIPTION OF THE DRAWINGS

FIGS. 2A-2B illustrate using different PUF circuitry on different chips to reliably, and securely, store the same preselected, secret, non-random value.

FIG. 5 is a flowchart illustrating a method of using helper data to produce stored values.

FIG. 6 is a flowchart illustrating a method of using PUF circuitry and helper data to store values.

FIG. 7 is a flowchart illustrating a method of provisioning an integrated circuitry with helper data that produces selected values.

FIG. 8 is a flowchart illustrating a method of decrypting encrypted data.

DETAILED DESCRIPTION OF THE EMBODIMENTS

A "physically unclonable function" (PUF) circuit is a circuit that auto-generates a physically-defined "digital fingerprint" that may serve as a unique identifier for a semiconductor device—such as a microprocessor die. In general, PUF circuits rely on unique physical variations which occur naturally and inevitably during integrated circuit manufacturing. Since the magnitude of these variations are near the limits of what can be reliably measured by on-chip circuits, PUF circuits often rely on so-called "helper data" to ensure the PUF outputs on that chip can be reliably reproduced over time.

In an embodiment, multiple helper data solutions (a.k.a., helper data images) are generated to produce preselected non-random values (a.k.a., "target values") from the PUF circuit. Therefore, multiple preselected PUF output values may be generated for a given integrated circuit die, where each the output values are derived from a combination of the chip-unique PUF circuit and the chip-unique helper data solution. These helper data blocks are stored in a nonvolatile memory on the integrated circuit die. In an embodiment, the preselected non-random values may be used as secret encryption or decryption keys. In this manner, multiple secret values can be reliably stored within a chip, using a combination of the chip-unique PUF circuit and the multiple chip-unique helper data solution. This differs from the traditional use of PUF circuits, which is to create a single encryption/decryption key from a single helper data image, and use that single key to secure all NVM transactions via an encryption/decryption process.

FIGS. 1A-1E illustrate using physically unclonable function (PUF) circuitry as secure storage. In FIGS. 1A-1E, integrated circuit 110 comprises nonvolatile memory 130, processor 150, and physically unclonable function (PUF) circuit 180. Nonvolatile memory 130 stores helper data 161-163. Processor 150 is operatively coupled to PUF 180 and nonvolatile memory 130.

Figure 1A:
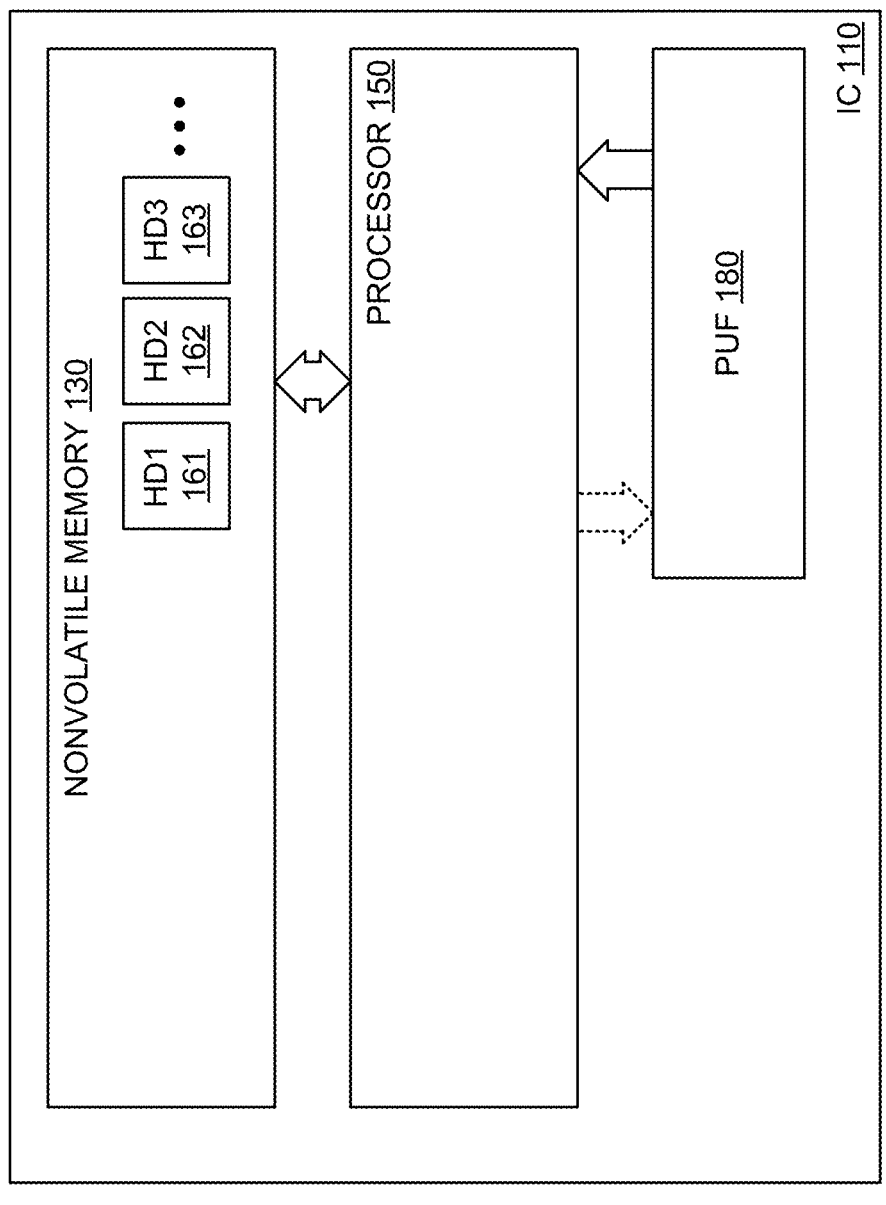
FIGS. 1A-1E illustrate using physically unclonable function (PUF) circuitry as storage.
Figure 1B:
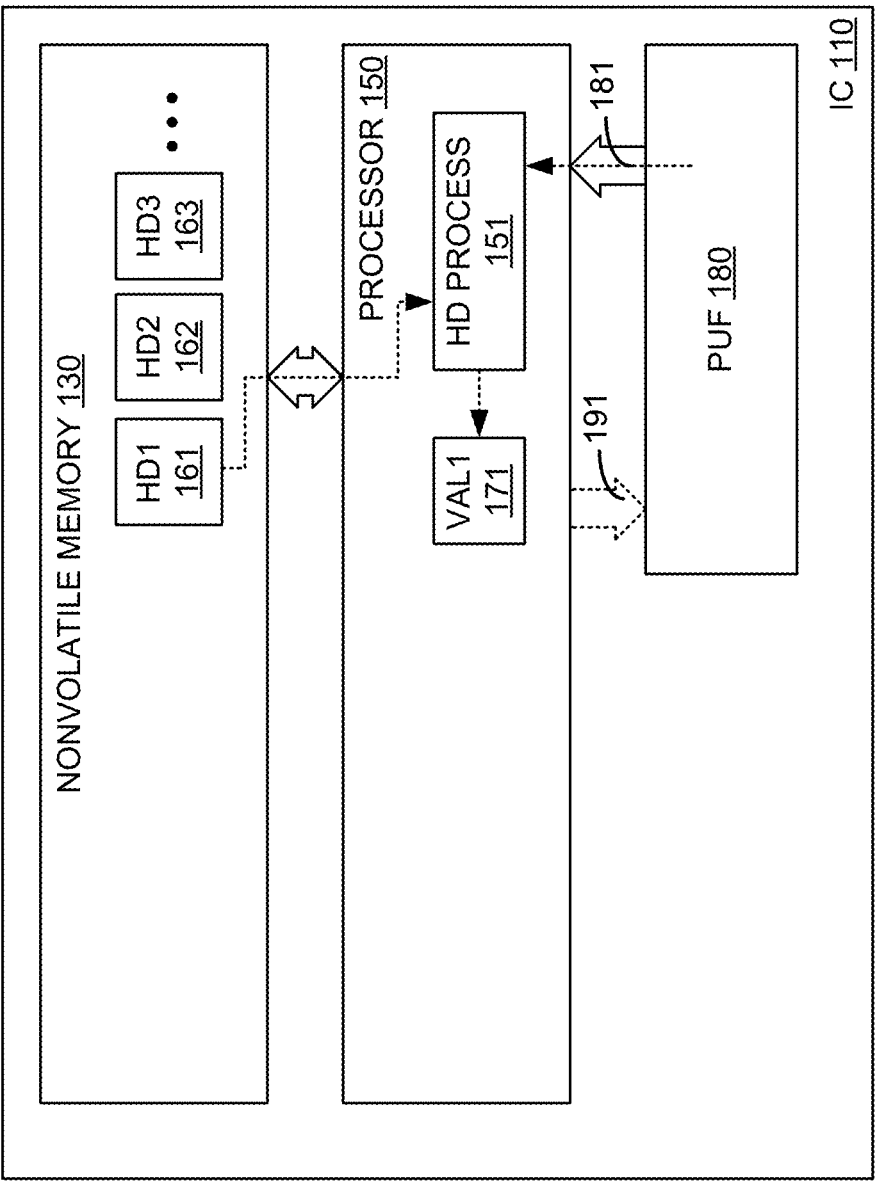

In an embodiment, each of helper data 161-163 have been generated (e.g., in a PUF "enrollment" process, familiar to those skilled in the art) such that the raw output of PUF 180 is processed according to the helper data 161-163 to produce respective preselected non-random values. The preselected values produced may be or include confidential data, secret authentication keys, secret encryption keys, secret decryption keys, etc. A circuit for producing a first preselected non-random value is illustrated in FIG. 1B by PUF 180 optionally being provided with an optional challenge stimulus 191 (e.g., voltage, current, digital value, etc.); raw PUF output data value 181 being provided from PUF 180 to helper data process 151 of processor 150; helper data process 151 receiving helper data 161; and helper data process 151 producing a first preselected value 171.

As used herein, the meaning of a preselected non-random value is intended to convey that while the value is dependent on the random nature of the PUF (e.g., PUF 180), the stable output value generated on-chip after helper-data processing has been preselected (e.g., by a host, or user). Of course, the preselected value itself may resemble a random number, it is just a specific random number that can be reliably generated and securely stored.

Figure 1C:
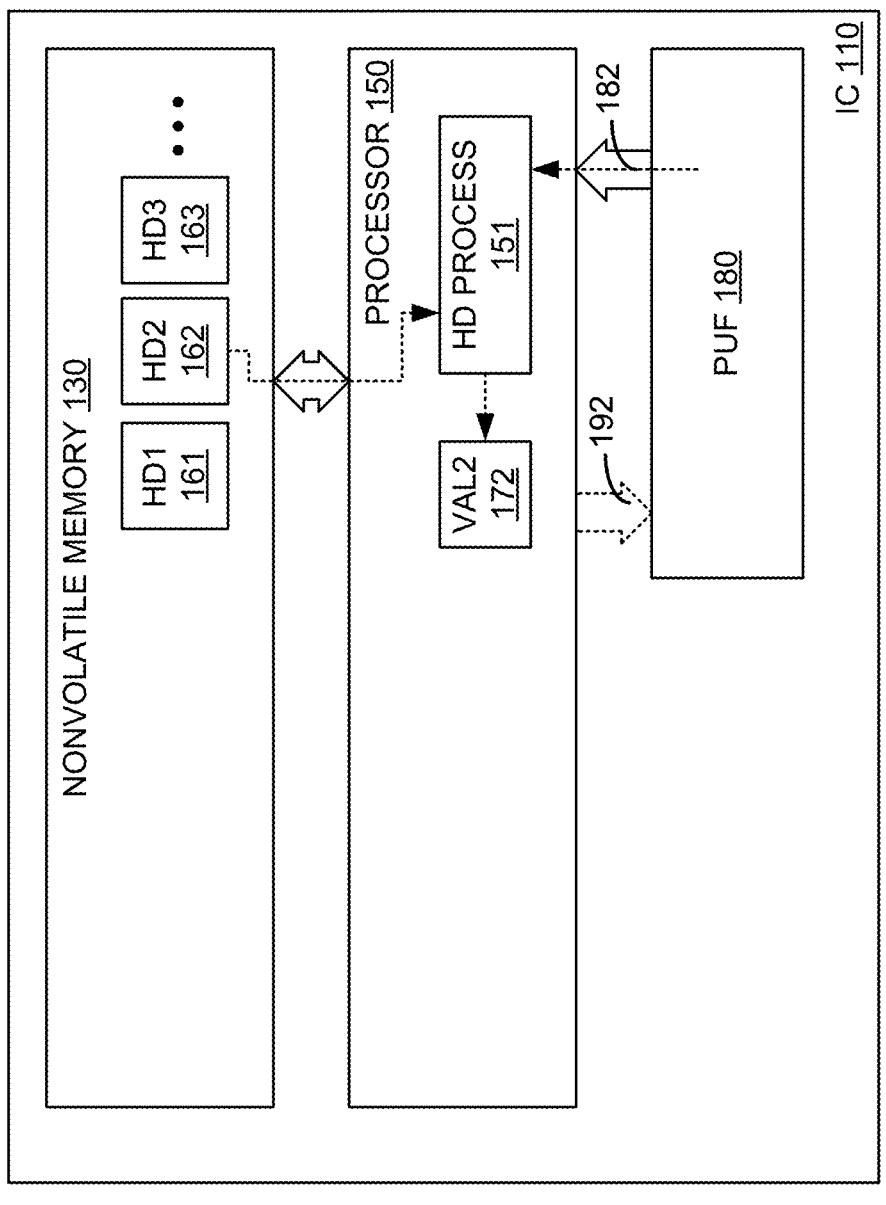

A circuit producing a second preselected non-random value is illustrated in FIG. 1C by PUF 180 optionally being provided with an optional challenge stimulus 192 (e.g., voltage, current, digital value, etc.); raw PUF output data value 182 being provided from PUF 180 to helper data process 151 of processor 150; helper data process 151 receiving helper data 162; and helper data process 151 producing a second preselected non-random (i.e., preselected) value 172.

Figure 1D:
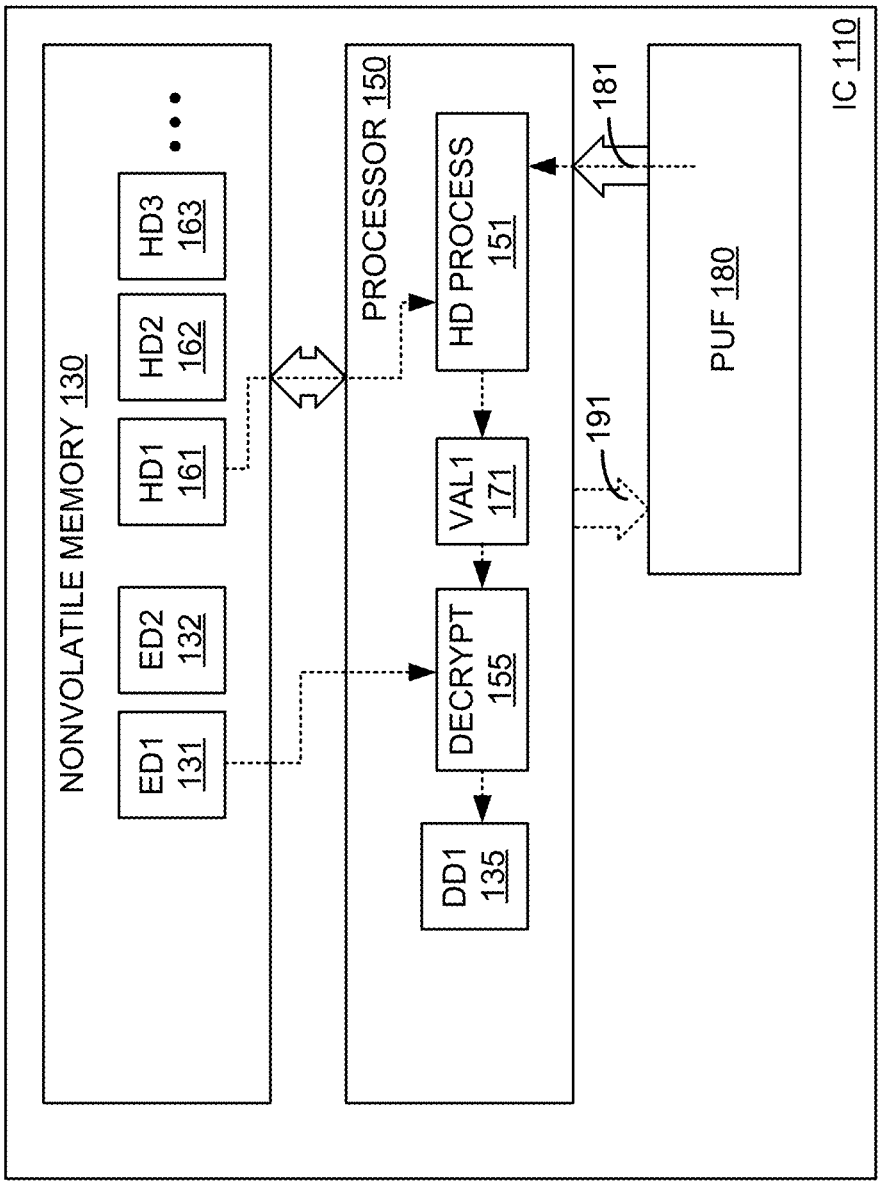

In an embodiment, the non-random values produced may be used as encryption or decryption keys (e.g., to further encrypt or decrypt important data). This is illustrated in FIG. 1D by the first preselected non-random value 171 produced by helper data process 151 based on helper data 161 and raw PUF output data value 181 being provided to a decryption process 155 which received encrypted data 131 and produces decrypted data 135. In an embodiment the encrypted data 131 may be stored in nonvolatile memory 130 as illustrated in FIG. 1D. In another embodiment, the encrypted data 131 may be received from another source, such as a host (not shown in FIGS. 1A-1E).

Figure 1E:
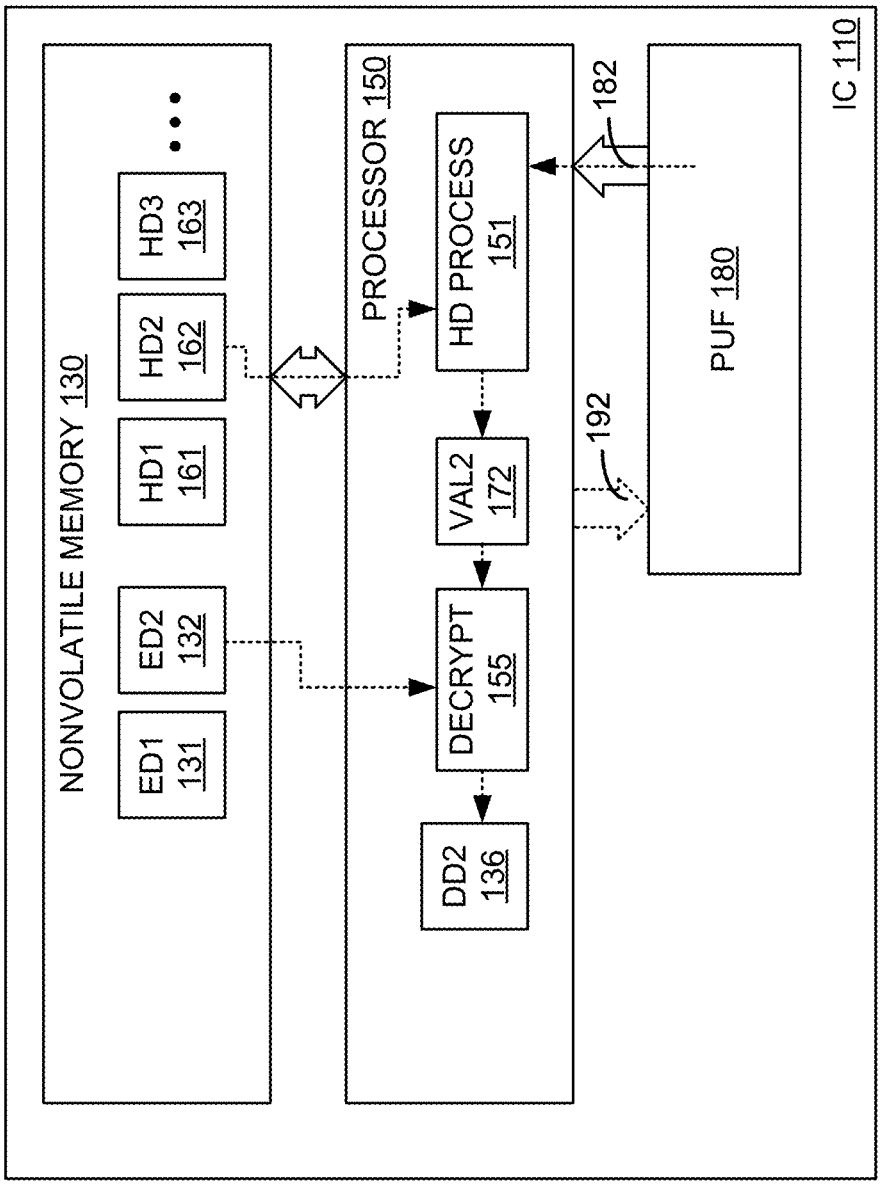

Because multiple helper data 161-163 may be provisioned into integrated circuit 110, multiple secret values may be provisioned (e.g., as decryption keys to decrypt multiple blocks of encrypted data). This is illustrated in FIG. 1E by the second preselected non-random value 172 produced by helper data process 151 based on helper data 162 and raw PUF output data value 182 being provided to a decryption process 155 which received encrypted data 132 and produces decrypted data 136. In an embodiment the encrypted data 132 may be stored in nonvolatile memory 130 as illustrated in FIG. 1E. In another embodiment, the encrypted data 132 may be received from another source, such as a host (not shown in FIGS. 1A-1E).

FIGS. 2A-2B illustrate using different PUF circuitry on different chips to reliably, and securely, store the same preselected, secret, non-random value. In FIGS. 2A-2B, integrated circuit 210a comprises nonvolatile memory 230a, processor 250a, and physically unclonable function (PUF) circuit 280a. Nonvolatile memory 230a stores helper data 261a-263a. Processor 250a is operatively coupled to PUF 280a and nonvolatile memory 230a. Integrated circuit 210b comprises nonvolatile memory 230b, processor 250b, and physically unclonable function (PUF) circuit 280b. Nonvolatile memory 230b stores helper data 261b-263b. Processor 250b is operatively coupled to PUF 280b and nonvolatile memory 230b. Integrated circuits 210a-210b are separate integrated circuits and therefore have different manufacturing variations. This results in PUF 280*a* and PUF 280*b* producing different raw PUF output data values 281*a*-281*b*. In an embodiment, each of helper data 261*a*-263*a* have been selected such that the raw output of PUF 280*a* is processed according to the helper data 261*a*-263*a* to produce respective preselected values.

FIG. 2A illustrates integrated circuit 210*a* and integrated circuit 210*b* producing the same preselected non-random value 271 from different raw PUF output data values 281*a*-281*b*. Integrated circuit 210*a* produces a first preselected non-random value 271 using PUF 280*a* and helper data 261*a*. PUF 280*a* is optionally provided with a challenge stimulus 291*a* (e.g., voltage, current, digital value, etc.). Raw PUF output data value 281*a* output by PUF 280*a* is provided to helper data process 251*a* of processor 250*a*. Helper data process 251*a* receives helper data 261*a*. Based on the raw PUF output data value 281*a* and helper data 261*a*, helper data process 251*a* produces a first non-random (i.e., preselected) value 271.

Integrated circuit 210*b* also produces the first preselected non-random value 271 using PUF 280*b* and helper data 261*b*. PUF 280*b* is optionally provided with a challenge stimulus 291*b* (e.g., voltage, current, digital value, etc.). Raw PUF output data value 281*b* output by PUF 280*b* is provided to helper data process 251*b* of processor 250*b*. Helper data process 251*b* receives helper data 261*b*. Based on the raw PUF output data value 281*b* and helper data 261*b*, helper data process 251*b* produces the first non-random (i.e., preselected) value 271. Thus, it should be understood that by selecting helper data 261*a* and helper data 261*b* to produce value 271 based on the raw PUF output data values 281*a*-281*b*, respectively, integrated circuits 210*a*-210*b* can both produce the same value 271 even though raw PUF output data values 281*a*-281*b* are different (because of manufacturing variations present in PUFs 280*a*-280*b*).

FIG. 2B illustrates integrated circuit 210*a* and integrated circuit 210*b* using the same preselected secret value to, for example, decrypt the same encrypted data using different raw PUF output data values 281*a*-281*b*. Integrated circuit 210*a* produces a second preselected non-random value 272 using PUF 280*a* and helper data 262*a*. PUF 280*a* is optionally provided with a challenge stimulus 292*a* (e.g., voltage, current, digital value, etc.). Raw PUF output data value 282*a* output by PUF 280*a* is provided to helper data process 251*a* of processor 250*a*. Helper data process 251*a* receives helper data 262*a*. Based on the raw PUF output data value 282*a* and helper data 262*a*, helper data process 251*a* produces a second non-random (i.e., preselected) value 272. This second non-random value 272 is provided to decryption process 255*a* that is also provided with encrypted data 231. Decryption process 255*a* uses the second non-random value 272 to decrypt encrypted data 231 into decrypted data 235.

Integrated circuit 210*b* also produces the second preselected non-random value 272 using PUF 280*b* and helper data 262*b*. PUF 280*b* is optionally provided with a challenge stimulus 292*b* (e.g., voltage, current, digital value, etc.). Raw PUF output data value 282*b* output by PUF 280*b* is provided to helper data process 251*b* of processor 250*b*. Helper data process 251*b* receives helper data 262*b*. Based on the raw PUF output data value 281*b* and helper data 262*b*, helper data process 251*b* produces the second non-random value 272. This second non-random value 272 is provided to decryption process 255*b* that is also provided with encrypted data 231. Decryption process 255*b* uses the second non-random value 272 to decrypt encrypted data 231 into decrypted data 235. Thus, it should be understood that by selecting helper data 262*a* and helper data 262*b* to produce value 272 based on the raw PUF output data values 282*a*-282*b*, respectively, integrated circuits 210*a*-210*b* can both decrypt encrypted data 231 to produce the same decrypted data 235 even though raw PUF output data values 282*a*-282*b* are different (because of manufacturing variations present in PUFs 280*a*-280*b*).

Figure 3A:
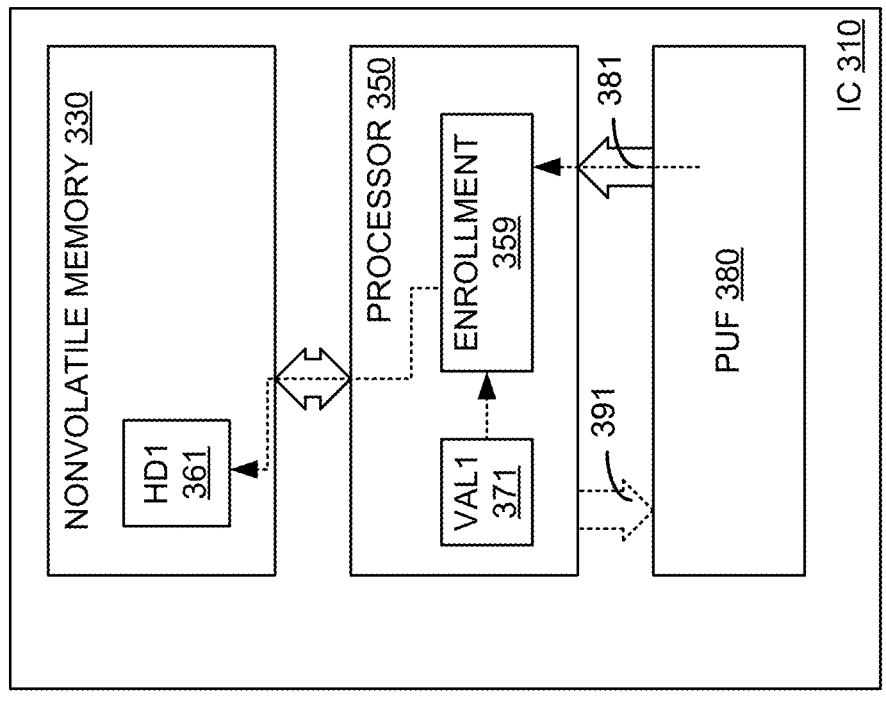
FIGS. 3A-3B illustrate generating helper data to store secret data using a PUF circuit.
Figure 3B:
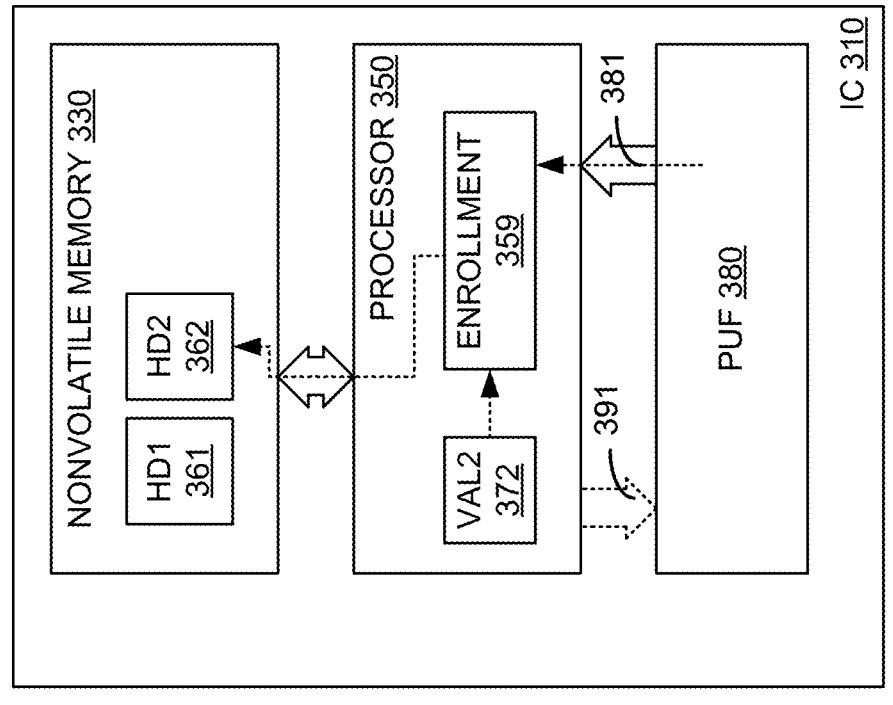

FIGS. 3A-3B illustrate generating helper data to store secret data using a PUF circuit. In FIG. 3A-3B, integrated circuit 310 comprises nonvolatile memory 330, processor 350, and physically unclonable function (PUF) circuit 380. Processor 350 is operatively coupled to PUF 380 and nonvolatile memory 330. In an embodiment, the processes illustrated in FIGS. 3A-3B may be performed after manufacturing and testing is complete and integrated circuit 310 is in use by end users.

In FIG. 3A, enrollment process 359 is provided a first non-random value (a.k.a., "preselected value" or "target value") 371 and raw PUF output data value 381. In an embodiment, enrollment process 359 may then perform a first helper data image calculation process, such that PUF output data value 371 can be reliably produced from the raw PUF output data value 381. In other words, enrollment process 359 generates first helper data 361 such that a subsequent helper data process (e.g., helper data process 151 and helper data processes 251*a*-251*b*) (a.k.a., a regeneration process) will produce the first non-random value 371 when provided with helper data 361 and a raw PUF output data value 381 from PUF 380.

For example, first helper data 361 may provide additional data to reproduce the first non-random value 371 by using the raw PUF output data value 381 and/or identifying particular bits corresponding to the physical variations of the PUF 380 that should be selected and used to replicate the first non-random value 371 as an output value of PUF 380. For example, PUF 380 may correspond to a static random access memory (SRAM) and first helper data 361 may be a combination of the raw PUF output data value 381 and code words.

As an example, the first non-random value 371 may be a value of '00110.' The raw PUF output data value 381 from PUF 380 may be the values '001111111110' as a result of PUF 380's different physical variations. First helper data 361 may identify that the first four bits '0011' and the last bit '0' should be selected from the raw PUF output data value 381 to generate the first non-random value 371. Since the first helper data 361 includes information corresponding to a utilization of certain bits or other such information, then the information from the first helper data 361 alone does not reveal the first non-random value 371 to an attacker or other such unauthorized entity that is able to obtain the first helper data 361. In the same or alternative embodiments, the first helper data 361 may include additional information, such as the first four bits may be selected without being modified and then the fifth bit may be selected and inverted or performed with another type of modification. The first helper data 361 is stored in nonvolatile memory 330. In an embodiment, the processes illustrated in FIG. 3A may be performed during manufacturing and/or testing. In another embodiment, the processes illustrate in FIG. 3A may be optionally performed whenever a secret value needs to be securely stored by integrated circuit 310.

In FIG. 3B, enrollment process 359 is provided a second non-random value 372 and raw PUF output data value 381. In an embodiment, enrollment process 359 may then perform a second helper data image calculation process, such that PUF output data value 372 can be reliably produced from the raw PUF output data value 381. In other words, enrollment process 359 generates second helper data 362 such that a subsequent helper data process (e.g., helper data process 151 and helper data processes 251*a*-251*b*) (a.k.a., a regeneration process) will produce the second non-random value 372 when provided with helper data 362 and a raw PUF output data value 381 from PUF 380.

For example, second helper data 362 may provide additional data to reproduce the second non-random value 372 by using the raw PUF output data value 381 and/or identifying particular bits corresponding to the physical variations of the PUF 380 that should be selected and used to replicate the second non-random value 372 as an output value of PUF 380. For example, PUF 380 may correspond to a static random access memory (SRAM) and second helper data 362 may be a combination of the raw PUF output data value 381 and code words.

As an example, the second non-random value 372 may be a value of '01110.' The raw PUF output data value 381 from PUF 380 may be the values '001111111110' as a result of PUF 380's different physical variations. Second helper data 362 may identify that the third and fourth bits '01' and the last three bits '110' should be selected from the raw PUF output data value 381 to generate the second non-random value 371. Since the second helper data 362 includes information corresponding to a utilization of certain bits or other such information, then the information from the second helper data 362 alone does not reveal the second non-random value 372 to an attacker or other such unauthorized entity that is able to obtain the second helper data 362. In the same or alternative embodiments, the second helper data 362 may include additional information, such as the third and fourth bits may be selected without being modified and then one or more of the last three bits may be selected and inverted or performed with another type of modification. The second helper data 362 is stored in nonvolatile memory 330. In an embodiment, the processes illustrated in FIG. 3B may be performed during manufacturing and/or testing. In another embodiment, the processes illustrate in FIG. 3B may be optionally performed whenever a secret value needs to be securely stored by integrated circuit 310.

Figure 4:
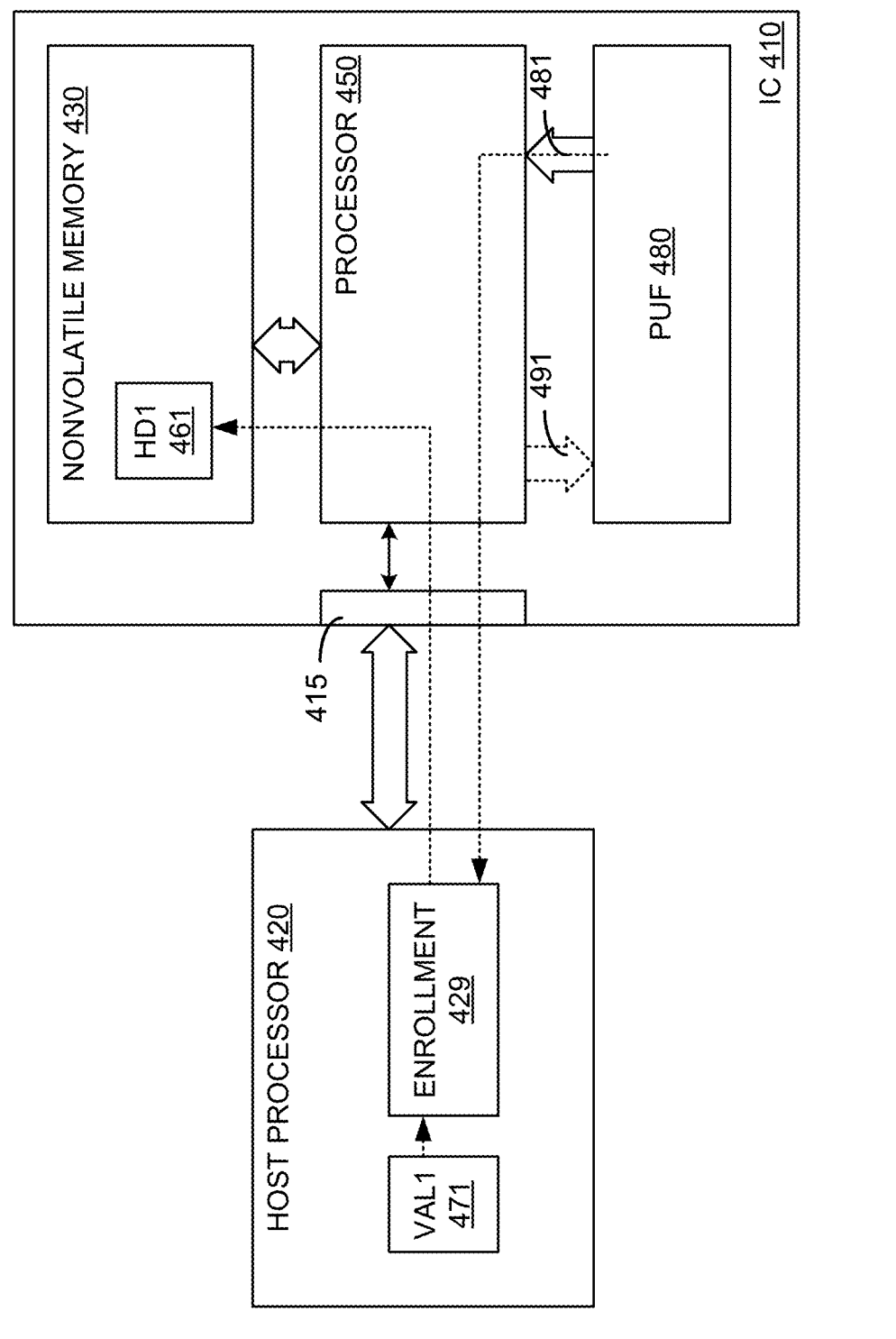
FIG. 4 illustrates provisioning an integrated circuit with helper data to store a value.

FIG. 4 illustrates provisioning an integrated circuit with helper data to store a value. In FIG. 4, system 400 comprises host processor 420 and integrated circuit 410. Integrated circuit 410 comprises interface 415, nonvolatile memory 430, processor 450, and physically unclonable function (PUF) circuit 480. Processor 450 is operatively coupled to interface 415, PUF 480, and nonvolatile memory 430. In an embodiment, the processes illustrate in FIG. 4 may be performed during manufacturing and/or testing.

In FIG. 4, enrollment process 429 executing on host processor 420 is provided a first non-random value 471. Host processor 420 is also provided, via interface 415, with raw PUF output data value 481. In an embodiment, enrollment process 429 may then perform a first helper data image calculation process, such that PUF output data value 471 can be reliably produced from the raw PUF output data value 481. In other words, enrollment process 429 generates first helper data 461 such that a subsequent helper data process (e.g., helper data process 151 and helper data processes 251*a*-251*b*) (a.k.a., a regeneration process) will produce the non-random value 471 when provided with helper data 461 and a raw PUF output data value 481 from PUF 480. The first helper data 461 is provided to integrated circuit 410 via interface 415 and stored in nonvolatile memory 430. The first helper data 461 may be stored in nonvolatile memory 430 under the control and/or command of host processor 420.

FIG. 5 is a flowchart illustrating a method of using helper data to produce stored values. One or more steps illustrated in FIG. 5 may be performed by, for example, integrated circuit 110, integrated circuit 210*a*, integrated circuit 210*b*, integrated circuit 310, system 400, and/or their components. By a first physically unclonable function (PUF) circuit, a raw PUF output data value is produced (502). For example, PUF 180 may produce raw PUF output data value 181.

Based on first helper data associated with a first non-random value, the first non-random value is produced from the raw PUF output data value (504). For example, helper data process 151 executing on processor 150 may use helper data 161 to produce value 171 from raw PUF output data value 181. Based on second helper data associated with a second non-random value, the second non-random value is produced from the raw PUF output data value (504). For example, helper data process 151 executing on processor 150 may use helper data 162 to produce value 172 from raw PUF output data value 181. In another example, helper data process 151 executing on processor 150 may use helper data 162 to produce value 172 from a different raw PUF output data value (e.g., raw PUF output data value 182) than the raw PUF data output value that was used to produce the first non-random value 171.

FIG. 6 is a flowchart illustrating a method of using PUF circuitry and helper data to store values. One or more steps illustrated in FIG. 6 may be performed by, for example, integrated circuit 110, integrated circuit 210*a*, integrated circuit 210*b*, integrated circuit 310, system 400, and/or their components. First helper data is generated to produce a first non-random value from raw PUF output data values produced by a first PUF (602). For example, helper data 361 to produce value 371 may be generated by enrollment process 359 from raw PUF output data values 381.

Second helper data is generated to produce a second non-random value from raw PUF output data values produced by the first PUF (604). For example, helper data 362 to produce value 372 may be generated by enrollment process 359 from raw PUF output data values 381. A first raw PUF output value is received from the first PUF (606). For example, helper data process 151 may receive raw PUF output data value 181 from PUF 180. The first non-random value is produced using the first helper data and the first raw PUF output value from the first PUF (608). For example, helper data process 151 may use helper data 161 to produce value 171 from raw PUF data output value 181.

A second raw PUF output value is received from the first PUF (608). For example, helper data process 151 may receive raw PUF output data value 182 from PUF 180. The second non-random value is produced using the second helper data and the second raw PUF output value from the first PUF (612). For example, helper data process 151 may use helper data 162 to produce value 172 from raw PUF output data value 182.

FIG. 7 is a flowchart illustrating a method of provisioning an integrated circuitry with helper data that produces selected values. One or more steps illustrated in FIG. 7 may be performed by, for example, integrated circuit 110, integrated circuit 210*a*, integrated circuit 210*b*, integrated circuit 310, system 400, and/or their components. A first value is provided to an enrollment process that will generate first helper data that will cause the raw data output values of a first PUF to be translated into the first value (702). For example, enrollment process 359 may be provided with a first value (e.g., value 371) to generate helper data 361 that will cause a helper data process (e.g., helper data process 151) to generate the first value from raw PUF output data values 381 from PUF 380.

A second value is provided to the enrollment process that will generate second helper data that will cause the raw data output values of the first PUF to be translated into the second value (704). For example, enrollment process 359 may be provided with a second value (e.g., value 372) to generate helper data 362 that will cause the helper data process (e.g., helper data process 151) to generate the second value from raw PUF output data values 381 from PUF 380.

The first helper data is stored in a nonvolatile memory (706). For example, processor 350 may store helper data 361 in nonvolatile memory 330. The second helper data is stored in the nonvolatile memory (708). For example, processor 350 may store helper data 362 in nonvolatile memory 330.

FIG. 8 is a flowchart illustrating a method of decrypting encrypted data. One or more steps illustrated in FIG. 8 may be performed by, for example, integrated circuit 110, integrated circuit 210*a*, integrated circuit 210*b*, integrated circuit 310, system 400, and/or their components. A first raw PUF output value is received from a first PUF (802). For example, raw PUF output data value 181 may be received by helper data process 151 from PUF 180.

A first non-random value is produced using a first helper data set stored in a nonvolatile memory and the first raw PUF output value from the first PUF (804). For example, helper data process 151 may produce value 171 from helper data 161, which is stored in nonvolatile memory 130, and raw PUF output data value 181 received from PUF 180. First encrypted data stored in the nonvolatile memory is decrypted using the first non-random value (806). For example, decryption process 155 may decrypt encrypted data 131, which is stored in nonvolatile memory 130, using value 171.

A second raw PUF output value is received from the first PUF (808). For example, raw PUF output data value 182 may be received by helper data process 151 from PUF 180. A second non-random value is produced using a second helper data set stored in a nonvolatile memory and the second raw PUF output value from the first PUF (810). For example, helper data process 151 may produce value 172 from helper data 162, which is stored in nonvolatile memory 130, and raw PUF output data value 182 received from PUF 180. Second encrypted data stored in the nonvolatile memory is decrypted using the second non-random value (812). For example, decryption process 155 may decrypt encrypted data 132, which is stored in nonvolatile memory 130, using value 172.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of integrated circuit 110, integrated circuit 210*a*, integrated circuit 210*b*, integrated circuit 310, system 400, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
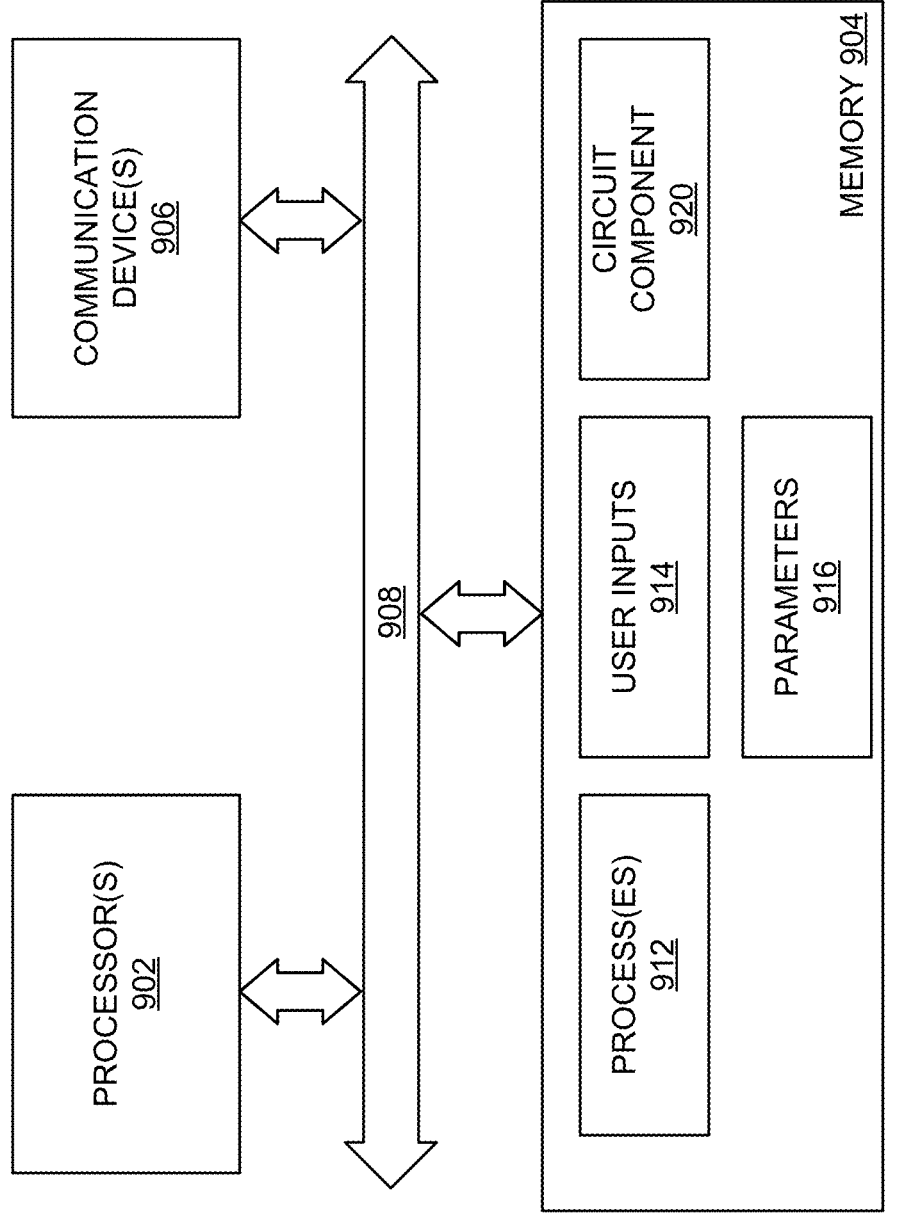
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of integrated circuit 110, integrated circuit 210*a*, integrated circuit 210*b*, integrated circuit 310, system 400, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: A method, comprising: producing, by a first physically unclonable function (PUF) circuit, a raw PUF output data value; based on first helper data associated with a first non-random value, producing the first non-random value from the raw PUF output data value; and based on second helper data associated with a second non-random value, producing the second non-random value from the raw PUF output data value.

Example 2: The method of example 1, wherein the first non-random value comprises a first secret key value to be used to decrypt first encrypted data and the second non-random value comprises a second secret key value to be used to decrypt second encrypted data.

Example 3: The method of example 1, further comprising: generating the first helper data to produce the first non-random value from a first plurality of raw PUF output data values produced by the first PUF circuit; and generating the second helper data to produce the second non-random value from a second plurality of raw PUF output data values produced by the first PUF circuit.

Example 4: The method of example 3, wherein the first plurality of raw PUF output data values and the second plurality of raw PUF output data values have at least one common raw output data value.

Example 5: The method of example 3, wherein the first plurality of raw PUF output data values is generated by the first PUF circuit during a manufacturing process.

Example 6: The method of example 5, wherein the second plurality of raw PUF output data values is generated by the first PUF circuit after the PUF circuit is deployed to an end-user application.

Example 7: The method of example 3, further comprising: generating third helper data to produce the first non-random value from a third plurality of raw PUF output data values produced by a second PUF circuit; and generating fourth helper data to produce the second non-random value from a fourth plurality of raw PUF output data values produced by the second PUF circuit.

Example 8: An integrated circuit, comprising: a first physically unclonable function (PUF) circuit to produce a first plurality of raw PUF output data values and a second plurality of raw PUF output data values; and first circuitry to use first helper data to produce a first non-random value from each of the first plurality of raw PUF output data values, and to use second helper data to produce a second non-random value from each of the second plurality of raw PUF output data values.

Example 9: The integrated circuit of example 8, wherein the first non-random value is to also be produced by second circuitry in a separate integrated circuit from a third plurality of raw PUF output data values produced by a second PUF circuit in the separate integrated circuit.

Example 10: The integrated circuit of example 9, wherein the first non-random value comprises a first secret key to be used by the integrated circuit to decrypt first encrypted data stored by the integrated circuit.

Example 11: The integrated circuit of example 10, wherein the first secret key to be used by the separate integrated circuit to decrypt the first encrypted data stored by the separate integrated circuit.

Example 12: The integrated circuit of example 8, further comprising: nonvolatile memory to store the first helper data and the second helper data.

Example 13: The integrated circuit of example 8, further comprising: enrollment circuitry to receive a third plurality of raw PUF output data values produced by the first PUF circuit and based on the third plurality of raw PUF output data values, generate the first helper data.

Example 14: The integrated circuit of example 8, further comprising: second circuitry to transmit a third plurality of raw PUF output data values produced by the first PUF circuit to a host and to receive, from the host, the first helper data.

Example 15: An integrated circuit, comprising: a first physically unclonable function (PUF) circuit; a first non-volatile memory storing first helper data generated using raw PUF data outputs produced by the first PUF circuit; and first circuitry to receive a first raw PUF data output produced by the first PUF circuit and to, using the first helper data stored in the first nonvolatile memory, produce a first non-random value.

Example 16: The integrated circuit of example 15, wherein the first nonvolatile memory also stores second helper data generated using raw PUF data outputs produced by the first PUF circuit, and the first circuitry is to receive a second raw PUF data output produced by the first PUF circuit, and is to, using the second helper data stored in the first nonvolatile memory, produce a second non-random value from the second raw PUF data output.

Example 17: The integrated circuit of example 15, wherein the first nonvolatile memory also stores second helper data generated using raw PUF data outputs produced by the first PUF circuit, and the first circuitry is to receive the first raw PUF data output produced by the first PUF circuit, and is to, using the second helper data stored in the first nonvolatile memory, produce a second non-random value from the first raw PUF data output.

Example 18: The integrated circuit of example 15, wherein the first non-random value is equal to a second non-random value produced by second circuitry in a separate integrated circuit based on a second raw PUF data output produced by a second PUF circuit in the separate integrated circuit using second helper data stored in a second nonvolatile memory in the separate integrated circuit, where the first helper data and the second helper data are not equal.

Example 19: The integrated circuit of example 18, wherein the first non-random value is used to decrypt first encrypted data stored in the first nonvolatile memory to produce first decrypted data and the second non-random value is used to decrypt second encrypted stored in the second nonvolatile memory to produce second decrypted data.

Example 20: The integrated circuit of example 19, wherein the first decrypted data and the second decrypted data are equal.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method, comprising:

storing first helper data, second helper data, first encrypted data, and second encrypted data in nonvolatile memory of a first integrated circuit;

producing, by a first physically unclonable function (PUF) circuit of the first integrated circuit, a raw PUF output data value;

based on first helper data associated with a first non-random value, producing, by the first integrated circuit, the first non-random value from the raw PUF output data value;

based on second helper data associated with a second non-random value, producing, by the first integrated circuit, the second non-random value from the raw PUF output data value; and decrypting, by the first integrated circuit, the first encrypted data based on the first non-random value; and decrypting, by the first integrated circuit, the second encrypted data based on the second non-random value.

2. The method of claim 1, wherein the first non-random value comprises a first secret key value that is used to decrypt the first encrypted data and the second non-random value comprises a second secret key value that is used to decrypt the second encrypted data.

3. The method of claim 1, further comprising:

generating the first helper data to produce the first non-random value from a first plurality of raw PUF output data values produced by the first PUF circuit; and generating the second helper data to produce the second non-random value from a second plurality of raw PUF output data values produced by the first PUF circuit.

4. The method of claim 3, wherein the first plurality of raw PUF output data values and the second plurality of raw PUF output data values have at least one common raw output data value.

5. The method of claim 3, wherein the first plurality of raw PUF output data values is generated by the first PUF circuit during a manufacturing process.

6. The method of claim 5, wherein the second plurality of raw PUF output data values is generated by the first PUF circuit after the PUF circuit is deployed to an end-user application.

7. The method of claim 3, further comprising:

generating third helper data to produce the first non-random value from a third plurality of raw PUF output data values produced by a second PUF circuit of a second integrated circuit; and generating fourth helper data to produce the second non-random value from a fourth plurality of raw PUF output data values produced by the second PUF circuit.

8. An integrated circuit, comprising:

nonvolatile memory to store first encrypted data;

a first physically unclonable function (PUF) circuit to produce a first plurality of raw PUF output data values and a second plurality of raw PUF output data values;

first circuitry to use first helper data to produce a first non-random value from each of the first plurality of raw PUF output data values, and to use second helper data to produce a second non-random value from each of the second plurality of raw PUF output data values; and decryption circuitry to, based on the first non-random value, decrypt the first encrypted data.

9. The integrated circuit of claim 8, wherein the first non-random value is to also be produced by second circuitry in a separate integrated circuit from a third plurality of raw PUF output data values produced by a second PUF circuit in the separate integrated circuit.

10. The integrated circuit of claim 9, wherein the first non-random value comprises a first secret key to be used by the integrated circuit to decrypt the first encrypted data stored by the nonvolatile memory of the integrated circuit.

11. The integrated circuit of claim 10, wherein the first secret key to be used by the separate integrated circuit to decrypt the first encrypted data stored by the separate integrated circuit.

12. The integrated circuit of claim 8, wherein the non-volatile memory is to store the first helper data and the second helper data.

13. The integrated circuit of claim 8, further comprising:

enrollment circuitry to receive a third plurality of raw PUF output data values produced by the first PUF circuit and based on the third plurality of raw PUF output data values, generate the first helper data.

14. The integrated circuit of claim 8, further comprising:

second circuitry to transmit a third plurality of raw PUF output data values produced by the first PUF circuit to a host and to receive, from the host, the first helper data.

15. An integrated circuit, comprising:

a first physically unclonable function (PUF) circuit;

a first nonvolatile memory storing first helper data generated using raw PUF data outputs produced by the first PUF circuit;

first circuitry to receive a first raw PUF data output produced by the first PUF circuit and to, using the first helper data stored in the first nonvolatile memory, produce a first non-random value; and decryption circuitry to, based on the first non-random value, decrypt first encrypted data stored by the integrated circuit.

16. The integrated circuit of claim 15, wherein the first nonvolatile memory also stores second helper data generated using raw PUF data outputs produced by the first PUF circuit, and the first circuitry is to receive a second raw PUF data output produced by the first PUF circuit, and is to, using the second helper data stored in the first nonvolatile memory, produce a second non-random value from the second raw PUF data output.

17. The integrated circuit of claim 15, wherein the first nonvolatile memory also stores second helper data generated using raw PUF data outputs produced by the first PUF circuit, and the first circuitry is to receive the first raw PUF data output produced by the first PUF circuit, and is to, using the second helper data stored in the first nonvolatile memory, produce a second non-random value from the first raw PUF data output.

18. The integrated circuit of claim 15, wherein the first non-random value is equal to a second non-random value produced by second circuitry in a separate integrated circuit based on a second raw PUF data output produced by a second PUF circuit in the separate integrated circuit using second helper data stored in a second nonvolatile memory in the separate integrated circuit, where the first helper data and the second helper data are not equal.

19. The integrated circuit of claim 18, wherein the first non-random value is to decrypt the first encrypted data stored in the first nonvolatile memory to produce first decrypted data and the second non-random value is used to decrypt second encrypted stored in the second nonvolatile memory to produce second decrypted data.

20. The integrated circuit of claim 19, wherein the first decrypted data and the second decrypted data are equal.

* * * * *